United States Patent
Muralidhar et al.

(10) Patent No.: US 7,190,940 B2
(45) Date of Patent: Mar. 13, 2007

(54) METHOD AND SYSTEM FOR FREQUENCY OFFSET ESTIMATION

(75) Inventors: Karthik Muralidhar, Robertsonpet (IN); Ser Wah Oh, Johor (MY)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 330 days.

(21) Appl. No.: 10/927,541

(22) Filed: Aug. 26, 2004

(65) Prior Publication Data

US 2005/0101275 A1 May 12, 2005

(30) Foreign Application Priority Data

Aug. 26, 2003 (SG) .............................. 200304873-3

(51) Int. Cl.
*H04B 1/06* (2006.01)
(52) U.S. Cl. ...................... 455/265; 375/147; 375/344; 375/375
(58) Field of Classification Search .................. 455/75, 455/192.2, 265; 375/147, 148, 149, 150, 375/152, 344, 375
See application file for complete search history.

(56) References Cited

U.S. PATENT DOCUMENTS 6,996,156 B1 * 2/2006 Ono ........................... 375/147
2002/0045433 A1 * 4/2002 Vihriala ...................... 455/313

* cited by examiner

*Primary Examiner*—Lee Nguyen
(74) *Attorney, Agent, or Firm*—Lisa K. Jorgenson; Dennis M. de Guzman; Seed IP Law Group PLLC

(57) ABSTRACT

A method and system for estimating a frequency offset between a receiver and a transmitter, including the steps of, or means for: (a) receiving a first signal from said transmitter and demodulating the first signal; (b) performing a frequency shift on said first signal by a predetermined frequency factor to generate a second signal; (c) filtering each of said first and second signals; (d) determining the power of each of the filtered first and second signals; (e) determining an upper corner frequency value of the first signal using the power of the filtered first and second signals; (f) determining a lower corner frequency of the first signal using the determined power of the filtered first and second signals; and (g) determining a frequency offset value based on said upper corner frequency value and said lower corner frequency value.

38 Claims, 7 Drawing Sheets

METHOD AND SYSTEM FOR FREQUENCY OFFSET ESTIMATION

BACKGROUND OF THE INVENTION

1. Field of the Invention

The present disclosure generally relates to a method and system for estimating the relative frequency offset between a Base Station Transmitter and Mobile Station Receiver for a wireless communications system, and in particular but not exclusively, for a Wideband Code Division Multiple Access ("W-CDMA") radio telecommunications system.

2. Description of the Related Art

In a radio communications system, signals are typically transmitted from the fixed location of a Base Station ("BS") (such as a radio transmission tower) and travel towards a moveable Mobile Station Receiver ("MSR") (such as a mobile phone) via many different physical paths. The signal received by the MSR will rarely be in exactly the same form as the original transmitted signal, due to influences from the physical environment during propagation. Along each propagation path, the signal may be subjected to interference from background noise, reflection off objects in the physical environment, signal attenuation due to the distance of the path between the BS and the MSR, or be subjected to frequency variations due to the relative motion between the MSR and the BS (i.e., resulting from the Doppler Effect). By the time the transmitted signal is received by the MSR, the signals from each of the different propagation paths may each be attributed with a different phase delay.

In order to improve the reception capability of the MSR, it is desirable to receive signals from different propagation paths and combine them in a coherent manner. For example, a transmitted signal which is received by the MSR via two different propagation paths should be combined in phase to achieve the best reception results. If those two signals were received and combined by the MSR in anti-phase (or 180° in phase apart) then those two signals will cancel each other out, which thus leads to loss of information or performance. Therefore, it is necessary to estimate the phase of each received signal from each path and correct any phase differences between those received signals before combining the individual paths.

Some systems (such as 3GPP UTRA-FDD systems) use a pilot channel, which is a continuous modulation of a known bit sequence in the transmitted signal. Using the pilot channel, it is possible to estimate the phase of different signals received corresponding to different propagation paths before combining them together. As a by-product to measuring the phase of pilot symbols received by a coherent MSR receiver, it may also be possible to estimate the relative frequency offset that exists between the BS and MSR.

The clocks in the BS and MSR are not synchronized, thus creating a frequency offset between the generated frequencies in the BS and MSR. It is desirable for the MSR to estimate, and compensate for, this frequency offset since without such correction, degradation of the signal will result and thus affect the MSR's reception performance. One technique used to estimate the frequency offset involves applying an inverse tangent function on the demodulated pilot symbols and its complex conjugate. This technique requires division, which is complex to implement. Also, the output of the inverse tangent function can only be calculated to approximation (by using Taylor series or lookup tables) which inevitably results in errors or imprecision.

It is desired to provide an improved processing method and system for estimating the frequency offset between the BS and MSR, or to at least provide a useful alternative to the prior art.

BRIEF SUMMARY OF THE INVENTION

One embodiment of the present invention provides a method for estimating a frequency offset between a receiver and a transmitter, the method including:

(a) receiving a first signal from said transmitter and demodulating said first signal;

(b) performing a frequency shift on said first signal by a predetermined frequency factor to generate a second signal;

(c) filtering each of said first and second signals;

(d) determining the power of each of said filtered first and second signals;

(e) determining an upper corner frequency value of said first signal using the determined power of said filtered first and second signals;

(f) determining a lower corner frequency value of said first signal using the determined power of said filtered first and second signals; and (g) determining a frequency offset based on said upper corner frequency value and said lower corner frequency value.

In an embodiment, (e) includes: performing a comparison of the power of said filtered first signal with the power of said filtered second signal, and if said comparison indicates that a first predetermined condition is not satisfied, performing a first adjustment of said frequency factor and repeating (b) to (d). If said comparison indicates that the first predetermined condition is satisfied, the method includes performing a second adjustment of said frequency factor. The comparison includes determining whether the power of said filtered second signal is less than the power of said filtered first signal multiplied by a predetermined correction factor. The first adjustment of said frequency factor comprises increasing said frequency factor. The second adjustment includes subtracting a predefined control factor, X, from said frequency factor. The method further includes performing a comparison of the control factor, X, with a predetermined accuracy level, wherein if the comparison indicates that a second predetermined condition is not satisfied, said first adjustment is performed. The first adjustment includes assigning a new value of X/2 to said control value, and adding the new control factor to said frequency factor before repeating (b) to (d).

The comparison of the control factor with the predetermined accuracy level is represented by $X=2^{-a}$, where a is a predetermined integer greater than zero.

In an embodiment, (c) includes low pass filtering each of said first and second signals.

In an embodiment, (f) includes: performing a comparison of the power of said filtered first signal with the power of said filtered second signal, and if said comparison indicates that a first predetermined condition is not satisfied, performing a first adjustment of said frequency factor and repeating (b) to (d). If said comparison indicates that the first predetermined condition is satisfied, the method includes performing a second adjustment of said frequency factor. The comparison includes determining whether the power of said filtered second signal is less than the power of said filtered first signal multiplied by a predetermined correction factor. The first adjustment of said frequency factor comprises decreasing said frequency factor. Said second adjustment includes adding a predefined control factor, X, to said frequency factor. The method further includes performing a comparison of the control factor, X, with a predetermined accuracy level, wherein if the comparison indicates that a second predetermined condition is not satisfied, said first adjustment is performed. Said first adjustment includes assigning a new value of X/2 to said control value, and subtracting the new control factor from said frequency factor before repeating (b) to (d).

In another aspect, the invention relates to a system for estimating a frequency offset between a receiver and a transmitter, the system having means to perform the method described above.

In another aspect, the present invention provides a system for estimating a frequency offset between a receiver and a transmitter, including:

a) means for receiving a first signal from said transmitter and demodulating said first signal;

b) means for performing a frequency shift on said first signal by a predetermined frequency factor to generate a second signal;

c) filter means for filtering each of said first and second signals;

d) means for determining the power of each of said filtered first and second signals; and e) processor means for determining upper and lower corner frequency values of said first signal using the determined power of said filtered first and second signals and for determining a frequency offset based on said determined upper and lower corner frequency values.

In one example embodiment, the receiver is a rake receiver. The rake receiver is housed in a mobile station. In one example embodiment, the transmitter is a base station transmitter.

In another aspect, the invention relates to a frequency offset estimation module of a rake receiver of a mobile station, comprising the system described above.

In another aspect, the invention relates to a mobile station having a frequency offset estimation module comprising the system described above. The system of the mobile station comprises means for performing the method described above.

BRIEF DESCRIPTION OF THE DRAWINGS

Embodiments of the present invention are hereinafter described, by way of non-limiting example only, with reference to the accompanying drawings, wherein.

DETAILED DESCRIPTION

Figure 1:
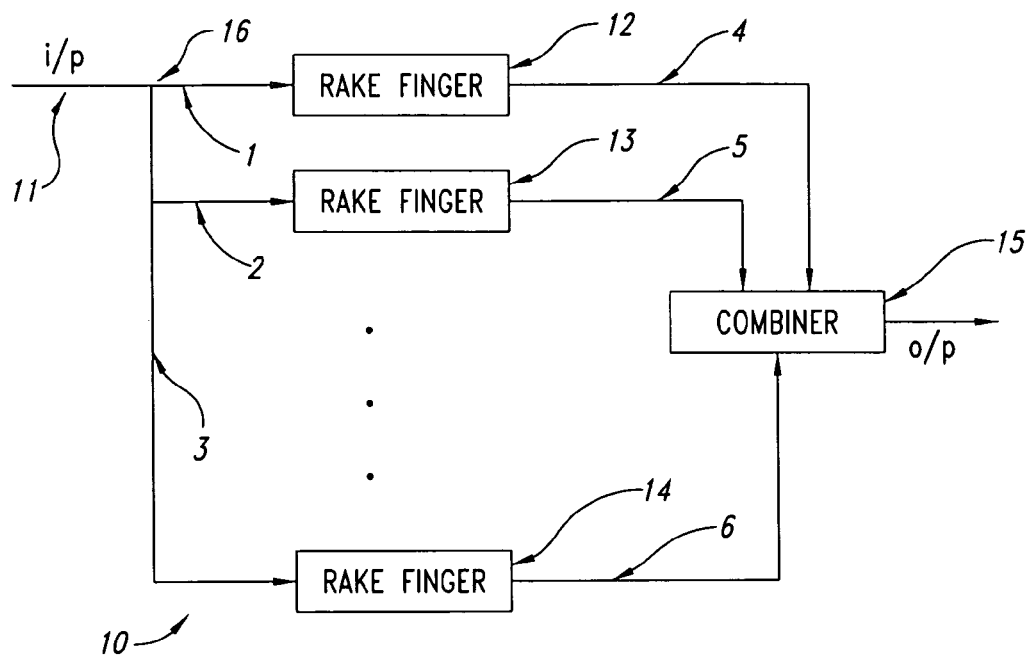
FIG. 1 is a block diagram of the components of an embodiment of a Rake Receiver.

Embodiments of a method and system for frequency offset estimation are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Code Division Multiple Access ("CDMA") systems are spread spectrum systems that employ radio channels with a much larger bandwidth (for example, 1.5 MHz for IS-95 systems and 5.0 MHz for 3GPP UTRA-FDD systems) than conventional Frequency Modulated ("FM") systems, which typically use around 25 kHz per channel. In CDMA systems, a single radio channel can simultaneously support multiple users, as opposed to FM systems, which can only support one user per radio channel.

In order to differentiate information intended for different recipients transmitted over a shared radio channel in a CDMA system, each user is assigned a unique pseudo random code (or "PN Code"). For example, an information sequence such as a stream of bits to be transmitted to a particular user (such as, an MSR having a particular PN Code associated with the intended recipient) typically involves multiplying each bit transmitted on the shared channel with the intended recipient's PN Code. The PN Code is a stream of chips where each bit of the information sequence belongs to SF chips of the PN code. SF is termed as the Spreading Factor. This technique is known as modulation, and is one of many ways of transmitting a signal intended for one user over a shared channel. The signal is received by all users of the shared channel but can only be successfully decoded by the MSR containing the intended recipient's PN Code. Typically, for 3GPP UTRA-FDD systems, the SF may range from 4 to 512 inclusive. If a CDMA system has a SF of 128, that means a maximum of 128 users can share a single channel in that system.

A MSR that has knowledge of a particular user's PN Code is able to differentiate information sequences in the signal received that are intended for that particular MSR from other information sequences intended for other users on the shared channel. Bits in the original transmitted information sequence are extracted from the signal by correlating the PN Code with the signal received by the MSR. This process of correlation is known as demodulation or de-scrambling.

For CDMA systems to work properly, the following must occur: the signals sent by the BS and the signals received by the MSR must be time-aligned; the auto-correlation properties of the PN Codes are high; and the cross-correlation properties of the PN Codes are near ideal (i.e., nearly zero).

As such, CDMA systems (such as IS-95 or 3GPP UTRA-FDD systems) may employ a pilot signal to maintain the integrity of the above conditions. The pilot signal is a constant bit sequence that is modulated using a predefined pseudo random code (or PN Code) which is specific to that particular BS. Both the pilot signal bit sequence and the PN Code used for its modulation remain constant for a particular BS. The pilot signal is modulated and transmitted by the BS as part of the transmitted signal over the shared channel.

FIG. 1 is a schematic illustration of an embodiment of a Rake Receiver 10 inside the MSR, which has a plurality of Rake Fingers 12, 13 and 14. These Rake Fingers are shown for illustrative purposes but more may be employed. In practice, the MSR may receive a plurality of signals since the original transmitted signal from the BS may travel to the MSR via different physical routes, since the signal may be reflected off many objects during propagation. Hence, the received input signal 11 (shown as "i/p") can be considered as the sum of many multipath signals. Each multipath signal is the sum of all signals that have the same time delay in traveling between the BS and MSR. Each multipath is characterized by this unique time delay. The received input signal 11 is split 16 for propagation along a plurality of processing paths 1, 2 and 3 to carry the received input signal 11 to each Rake Finger 12, 13 and 14 in the MSR. Each Rake Finger 12, 13 and 14 is assigned to demodulate one multipath from the received input signal 11. The output of each Rake Finger 12, 13 and 14 is then respectively passed along different processing paths 4, 5 and 6, all of which are inputs to the Combiner 15. The Combiner 15 then combines (i.e., superimposes) the demodulated outputs from each of the Rake Fingers 12, 13 and 14 and sends the combined output signal 17 (shown as "o/p") to other parts of the MSR for further processing.

Figure 2:
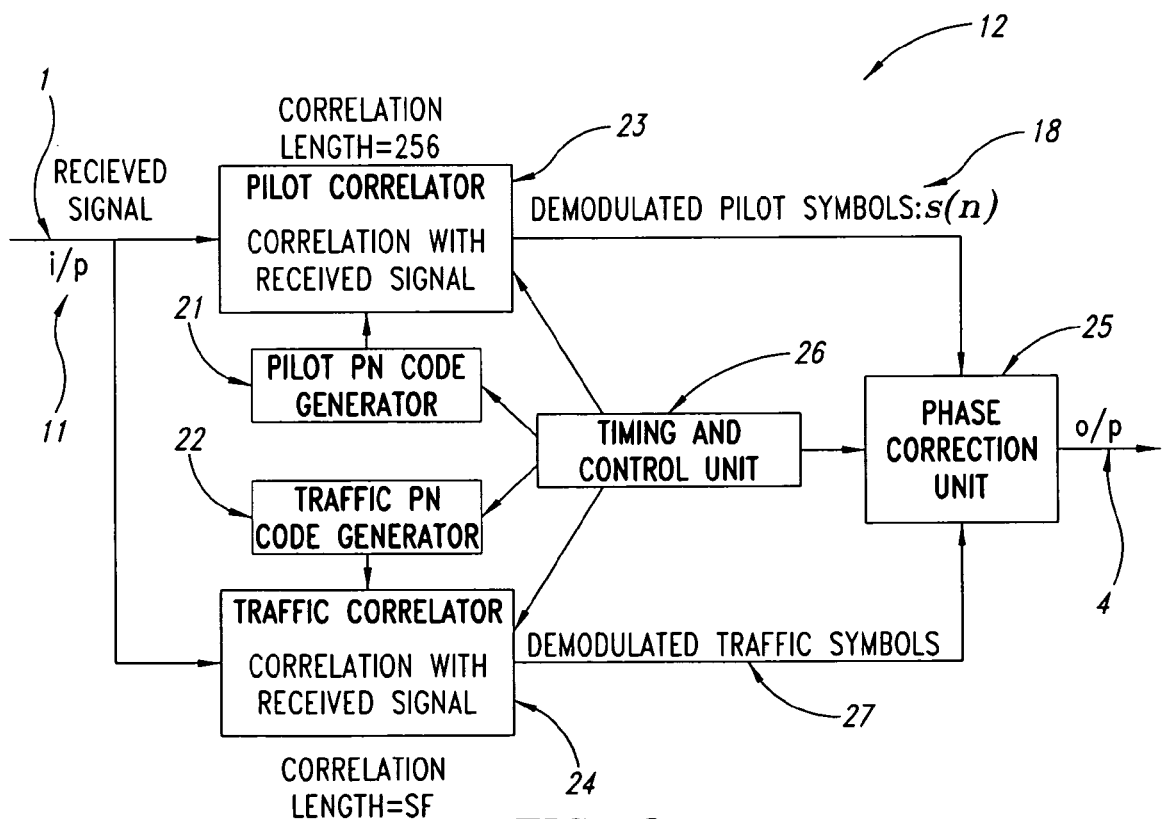
FIG. 2 is a block diagram of the components of an embodiment of a Rake Finger of the Rake Receiver shown in FIG. 1.

FIG. 2 schematically illustrates the components inside an embodiment of a single Rake Finger 12 as shown in FIG. 1. The internal components of the Rake Finger 12, shown in FIG. 2, are the same for all Rake Fingers (e.g., 12, 13 and 14) in the Rake Receiver 10. The Rake Finger 12 receives an input signal 11 from a processing path 1. The received input signal 11 includes traffic signals (which are bits corresponding to data symbols) and pilot signals (which are bits corresponding to pilot symbols). The Rake Finger 12 includes a Pilot PN Code Generator 21, which generates the predefined PN Code required for that particular BS for demodulating pilot symbols. The Traffic PN Code Generator 22 generates a particular unique traffic PN Code for demodulating data bits intended for a particular user. The Rake Finger 12 also includes a Pilot Correlator 23 and a Traffic Correlator 24, which respectively correlates the pilot and traffic PN Codes generated by the Pilot PN Code Generator 21 and Traffic PN Code Generator 22 respectively with the received input signal 11. The Pilot Correlator 23 outputs demodulated pilot symbols 18 to the Phase Correction Unit 25. Similarly, the Traffic Correlator 24 outputs demodulated traffic symbols to the Phase Correction Unit 25. The number of inputs (or also known as "chips") from the received input signal 11 that are used in order to demodulate one output bit corresponding to a data symbol 27 or a pilot symbol 18 is known as the correlation length. For 3GPP UTRA-FDD systems, the Pilot Correlator 23 uses a correlation length of 256, for example. The Traffic Correlator 24 uses a correlation length of 4, 8, 16, 32, 64, 128, 256 or 512, for example.

Due to the differing physical length of the propagation path for each multipath, and also the frequency offset due to the Doppler effect, the traffic symbols undergo phase rotation (or phase delay) by the time they reach the MSR. The phase of the signal received 11 is corrected by the Phase Correction Unit 25. The Phase Correction Unit determines the phase delay for the current portion of the received input signal using demodulated pilot symbols from the Pilot Correlator 23, and accordingly corrects any phase delay in the current portion of the demodulated traffic symbols from the Traffic Correlator 24.

To achieve optimal performance in a W-CDMA system, it is desirable that the chip period ($T_c$) for each chip in a pilot or traffic PN Code are maintained the same between the BS and MSR (i.e., they are kept time aligned). Failure to do so results in poorer accuracy for determining each of the chips transmitted on the shared channel, since the timing of each chip begins to drift (or overlap) with adjacent chips in the received input signal 11. The Timing and Control Circuit 26 corrects the timing of code generators 21 22 and helps maintain the time alignment between the code generators 21 22 and the received signal 11. Since the clocks in the BS and MSR are not synchronized, a frequency offset between the frequencies generated in BS and MSR may arise. A frequency offset in the BS and MSR also makes it more difficult to accurately determine bits modulated with the pilot or a particular traffic PN Code. These factors degrade the overall performance of the MSR. It is therefore desirable to estimate the frequency offset in the BS and MSR and correct it. The estimation method herein described involves using the demodulated pilot symbols to estimate the frequency offset between the BS and MSR.

An example of an embodiment of a frequency offset estimation method is illustrated as follows. Assume that the BS transmits signals with a carrier frequency of $f_C$ Hertz ("Hz"). Further assume that the MSR receives only one direct signal from the BS (i.e., there are no reflected signals or multipaths), and that the MSR is moving with a relative speed of v in relation to the BS, and that $\theta$ is the angle between the received signal and the direction of movement of the MSR. The received signal will have just one frequency component, which can be represented as $f_C+f_d$ Hz. The shift in frequency, $f_d$, is known as the Doppler Shift which is attributed to the relative movement between the BS and MSR. The Doppler Shift, $f_d$, is given by Equation 1:

$$f_d = f_D \cos \theta \quad \text{Equation 1}$$

$$f_D = (v/c) f_C \quad \text{Equation 1A}$$

where v is the speed of the MSR, and c is the speed of light. The maximum value of $f_d$, (denoted by $f_D$) occurs when the angle $\theta=0$, and is given by Equation 1A.

In practice, the signal received by the MSR comprises of many reflections and can be grouped into multiple multipaths. Each multipath is composed of many signals. The many signals that make up a multipath have different angles of arrival ($\theta$) at the MSR. Typically, $\theta$ may vary between 180° to −180°. As per Equation 1, the Power Spectral Density ("PSD") of a particular multipath of the received signal is therefore band-limited between the two corner frequencies, $f_C+f_D$ and $f_C-f_D$, representing the two extremes of the Doppler Shift effect on the carrier signal. This phenomenon is called the Doppler spread of the multipath.

Each Rake Finger 12, 13 and 14 in the Rake Receiver 10 demodulates a particular multipath signal (i.e., the few dominating resolvable multipath signals received by the MSR). Due to correlation performed by the Pilot Correlator 23 in Rake Finger 12, the corner frequencies of the PSD of the demodulated pilot symbols are given by Equations 1B and 1C:

$$256 f_D \cdot T_C \text{ (where } \cos\theta = 0\text{)} \quad\quad \text{Equation 1B}$$

$$-256 f_D \cdot T_C \text{ (where } \cos\theta = \pi\text{)} \quad\quad \text{Equation 1C}$$

where $T_C$ is the chip period and it is assumed that a correlation length of 256 is used in the Pilot Correlator 23. Equation 1B represents the scenario where the MSR is traveling away from the BS and also is achieving the maximum Doppler Shift in the positive direction ($f_D$). Equation 1C represents the opposite scenario, where the MSR is traveling towards the BS and is achieving the maximum Doppler Shift in the negative direction ($-f_D$).

The timing difference between the BS and MSR clocks is measured in terms of differences in parts per million ("ppm"). This difference, leads to a mismatch in the generated frequencies of the BS and the MSR, called as the frequency offset ($f_o$). The frequency offset can be described as shown in Equation 2:

$$f_o = f_C \cdot \Delta\rho \quad\quad \text{Equation 2}$$

where $f_C$ is the carrier frequency (in Hertz) and $\Delta\rho$ is the clock difference (in ppm) between the MSR and BS clocks.

Figure 3A:
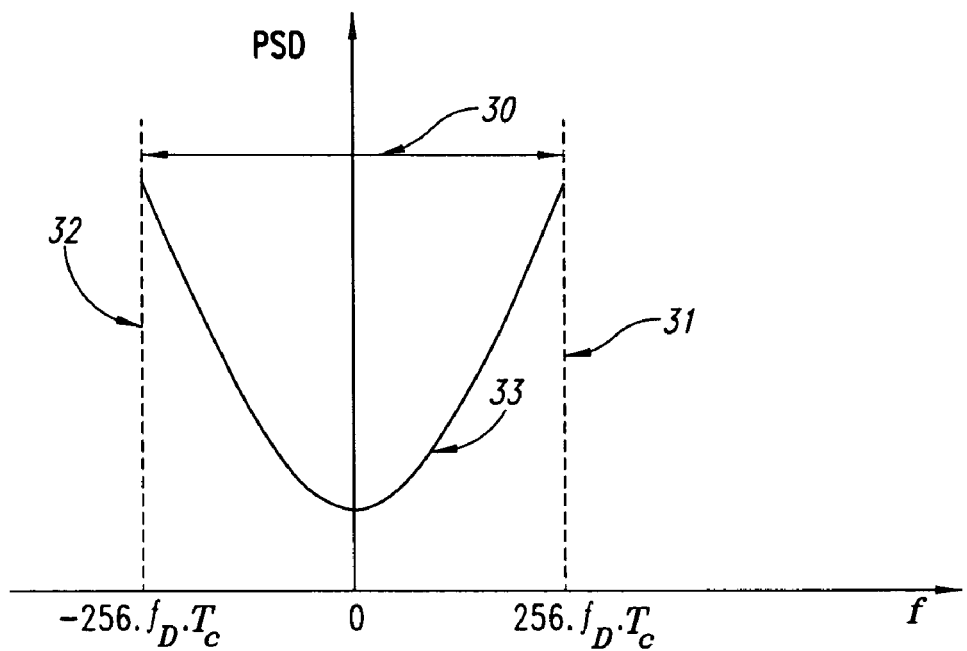
FIG. 3(a) is a graph of the power spectral density ("PSD") of demodulated pilot symbols in the absence of frequency offset.
Figure 3B:
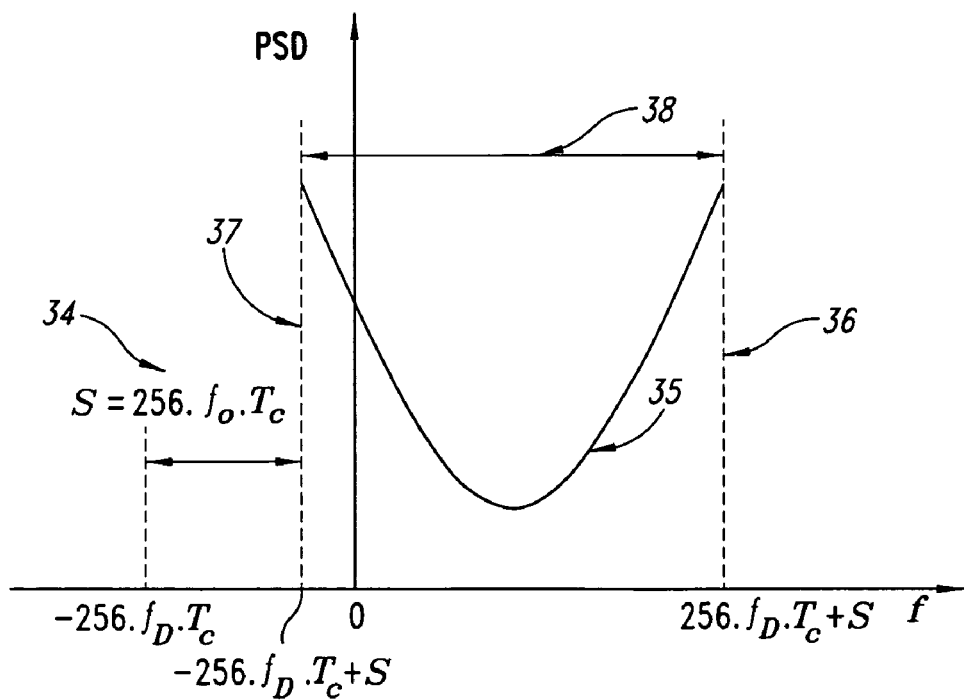
FIG. 3(b) is a graph of the power spectral density of demodulated pilot symbols in the presence of frequency offset.

FIG. 3(a) is a graph showing the PSD 33 of the demodulated pilot symbols without any frequency offset between the BS and MSR. According to Equations 1B and 1C, the PSD 33 is band-limited between two (an upper and lower) corner frequencies, being $256 \cdot f_D \cdot T_C$ (shown as item 31) and $-256 f_D \cdot T_C$ (shown as item 32) respectively. The bandwidth 30 of the PSD 33 corresponds to the spread of the PSD 33 between the two corner frequencies 31, 32. FIG. 3(b) is a graph showing the PSD 35 of demodulated pilot symbols in the presence of a positive frequency offset between the BS and MSR. The frequency offset causes the original PSD 33 to shift in a linear direction towards the right hand side of the graph by a factor of S 34 (where S is proportional to the frequency offset between the MSR and the BS). As a result, the new linearly shifted position of PSD 33 is shown by PSD 35, and the upper 31 and lower 32 corner frequencies of the original PSD 33 are also right shifted by a factor of S to positions 36 and 37 respectively. The bandwidth 38 of the shifted PSD 35 does not change (i.e., the bandwidth 38 of the PSD 35 is the same as the bandwidth 30 of the PSD 33).

The PSD 33 and shifted PSD 35 can also be referred to as the Normalized PSD 33 and Normalized PSD 35. Accordingly, the upper 36 and lower 37 corner frequencies of the Normalized PSD 35 can also be referred to as the Normalized Upper 36 and Normalized Lower 37 corner frequencies of the Normalized PSD 35 respectively.

As shown in FIG. 3(b), the Normalized PSD 35 of the demodulated pilot symbols is right shifted by a factor, S 34, in the presence of a frequency offset. S is determined by Equation 2A:

$$S = 256 f_o \cdot T_C \quad\quad \text{Equation 2A}$$

and the Normalized Upper 36 and Lower 37 corner frequencies of the Normalized PSD 35 are respectively expressed by Equations 2B and 2C, as follows.

$$S + 256 f_D \cdot T_C \quad\quad \text{Equation 2B}$$

$$S - 256 f_D \cdot T_C \quad\quad \text{Equation 2C}$$

By estimating the Normalized Upper 36 and Lower 37 corner frequencies of the Normalized PSD 35, it is possible to determine the frequency offset between the BS and MSR.

For example, let $f_m$ and $f_n$ be respectively defined as the frequency limits corresponding to the Upper 36 and Lower 37 corner frequencies of the Normalized PSD 35 for a CDMA system (e.g., a 3GPP UTRA-FDD system) using a correlation length of 256. In the presence of a frequency offset ($f_o$) and Doppler Shift ($f_D$), the values of $f_m$ and $f_n$ are respectively defined by Equations 3 and 4:

$$f_m = 256 f_D T_C + 256 f_o T_C \quad\quad \text{Equation 3}$$

$$f_n = -256 f_D T_C + 256 f_o T_C \quad\quad \text{Equation 4}$$

By solving Equations 3 and 4, the Doppler Shift ($f_D$) and frequency offset ($f_o$) are given by Equations 5 and 6 respectively:

$$f_D = (f_m - f_n)/(512 T_C) \quad\quad \text{Equation 5}$$

$$f_o = (f_m + f_n)/(512 T_C) \quad\quad \text{Equation 6}$$

As a by-product, from Equations 1A and 5, it follows that:

$$v = ((f_m - f_n) c)/(512 f_C \cdot T_C) \quad\quad \text{Equation 7}$$

From Equation 6, it can be seen that the frequency offset ($f_o$) between the BS and MSR can be determined if the frequency values corresponding to the Upper (i.e., $f_m$ 36) and Lower (i.e., $f_n$ 37) corner frequencies of the normalized PSD 35 are known.

Figure 4:
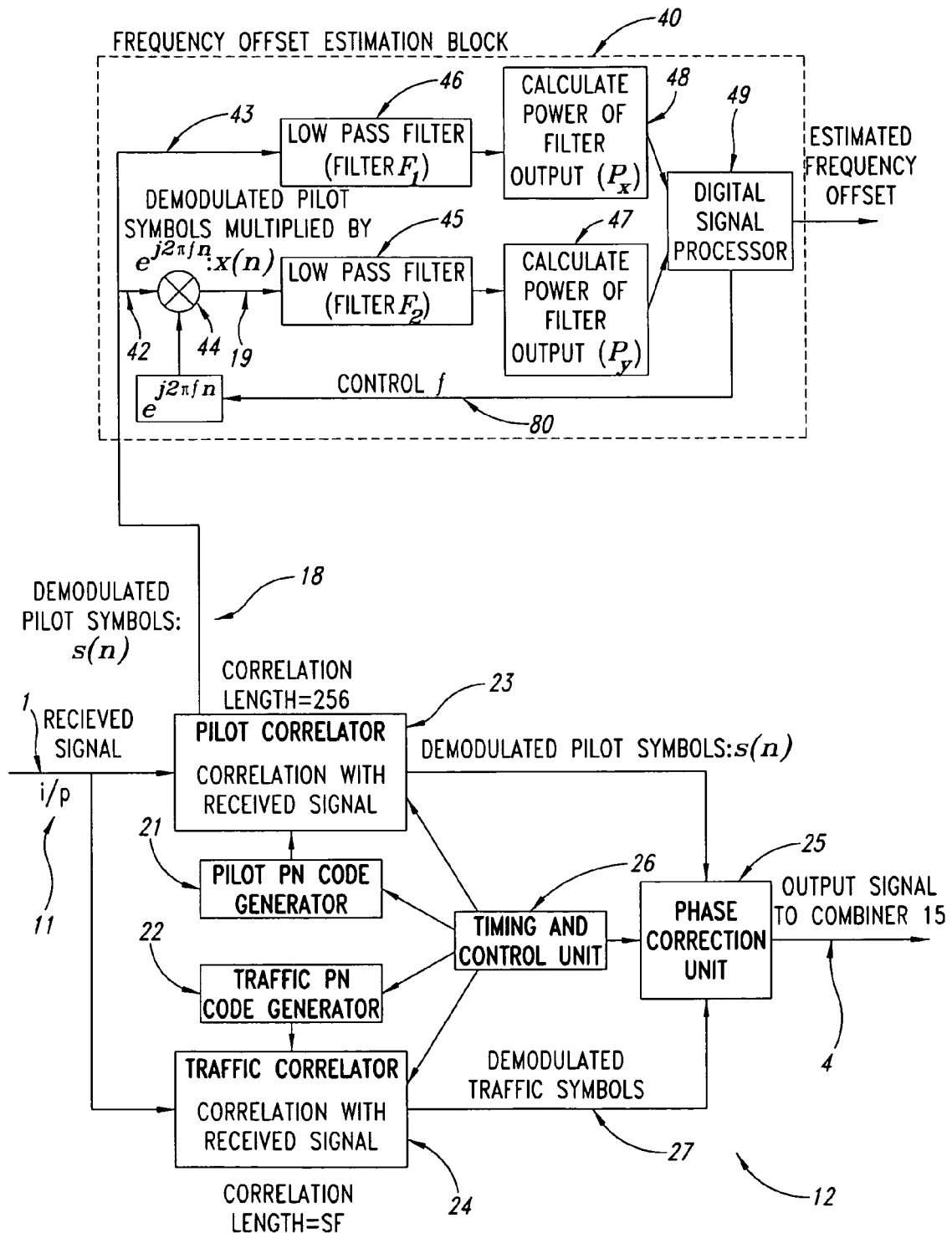
FIG. 4 is a block diagram of an embodiment of a Rake Finger including a Frequency Offset Estimation Block.

FIG. 4 is a diagram showing an embodiment of the process for estimating the Upper (i.e., $f_m$ 36) and Lower (i.e., $f_n$ 37) corner frequencies of the Normalized PSD 35. FIG. 4 is only an exemplary illustration of the process in one particular Rake Finger (e.g., for Rake Finger 12 in FIG. 1). In fact, the process in FIG. 4 can be implemented the same way for each of the Rake Fingers (e.g., items 12, 13 and 14 in FIG. 1) in the Rake Receiver 10. The received input signal 11 serves as input to the Rake Finger 12 and is passed to the Pilot Correlator 23. The Pilot Correlator 23 uses the PN Code generated by the Pilot PN Code Generator 21 for demodulating pilot symbols, s(n) 18, derived from the received input signal 11. The demodulated pilot symbols, s(n) 18, are then passed to the Frequency Offset Estimation Block 40 for further processing. Two identical copies of the demodulated pilot symbols, s(n), are split 41 along two separate processing paths 42 and 43. The demodulated pilot symbols propagated along path 42 are subjected to a multiplication process 44, which involves multiplying each pilot symbol in s(n) by the factor $e^{j2\pi fn}$ (where n is an integer, and $n \geq 0$). The multiplication process 44 can also be referred to as a process of performing complex rotation (or "frequency shifting") on the demodulated pilot symbols, s(n) 18. The effect of the complex rotation on the PSD of the demodulated pilot symbols 18 is shown in FIG. 5 and is described in more detail in this specification.

The output of the multiplication process 44 is a stream of adjusted pilot symbols, x(n) 19. All the adjusted symbols, x(n) 19, are passed through a low pass filter ("LPF") 45 (also referred to as "Filter $F_2$"). Similarly, the unaltered demodulated pilot symbols, s(n) 18, are propagated along path 43 and passed through a separate low pass filter 46 (also referred to as "Filter $F_1$"). The low pass filters 45 and 46 are identical, and the upper and lower corner frequencies of the filters can be denoted as LP and –LP respectively. The output of each of the low pass filters 45 and 46 are respectively passed through a separate device 47 and 48 (such as an integrator) for calculating the power of the output from each filter 45 and 46 respectively. The power of the output calculated from the low pass filter 46 is also referred to as $P_x$. Similarly, the power of the output calculated from the low pass filter 45 is also referred to as $P_y$. Both the power outputs $P_x$ and $P_y$ are passed to a Digital Signal Processor 49, which estimates the frequency offset ($f_o$). The Digital Signal Processor 49 also adjusts the value of f in the complex rotation factor ($e^{j2\pi fn}$) which is multiplied to subsequent demodulated pilot signals processed by the Frequency Offset Estimation Block 40.

Figure 5:
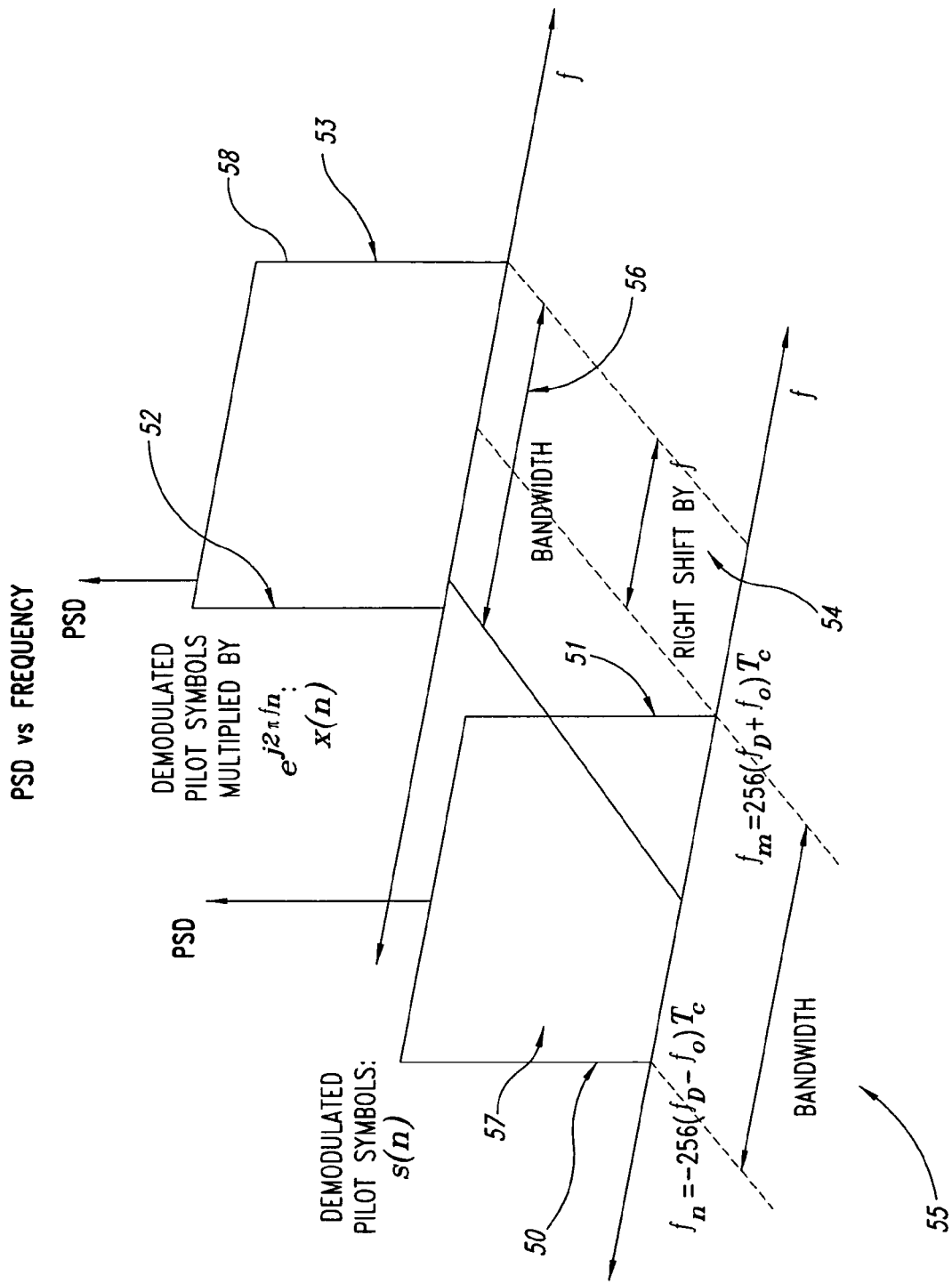
FIG. 5 is a graph illustrating a shift in the power spectral density of the demodulated pilot symbols due to complex rotation.

FIG. 5 shows, in three-dimensional representation, a graph 57 corresponding to the PSD of the demodulated pilot symbols in the presence of a frequency offset (i.e., the Normalized PSD of s(n) 18, as shown in FIG. 4) and another graph 58 of the PSD of the demodulated pilot symbols which have been shifted due to complex rotation (i.e., the PSD of x(n) 19, as shown in FIG. 4). When a positive value of f is used in the factor $e^{j2\pi fn}$, which is multiplied to each of the pilot symbols s(n) during complex rotation, the resultant PSD (e.g., the PSD shown as item 58 in FIG. 5) will be shifted towards the right hand side of the graph by the factor f. When a negative value of f is used in the factor $e^{j2\pi fn}$, the resultant PSD will be shifted towards the left hand side of the graph by the factor f. In the example shown in FIG. 5, a positive value of f is used and hence the resultant PSD 58 shifts to the right, and accordingly, both the upper and lower corner frequencies of the resultant PSD 58 are right shifted by the factor f 54 from positions 50 and 51 to positions 52 and 53 respectively. The respective bandwidths 55 and 56 of the PSD 57 and 58 are the same before and after complex rotation. The factor f 54 is used in the method described herein for estimating the frequency offset ($f_o$).

Figure 6:
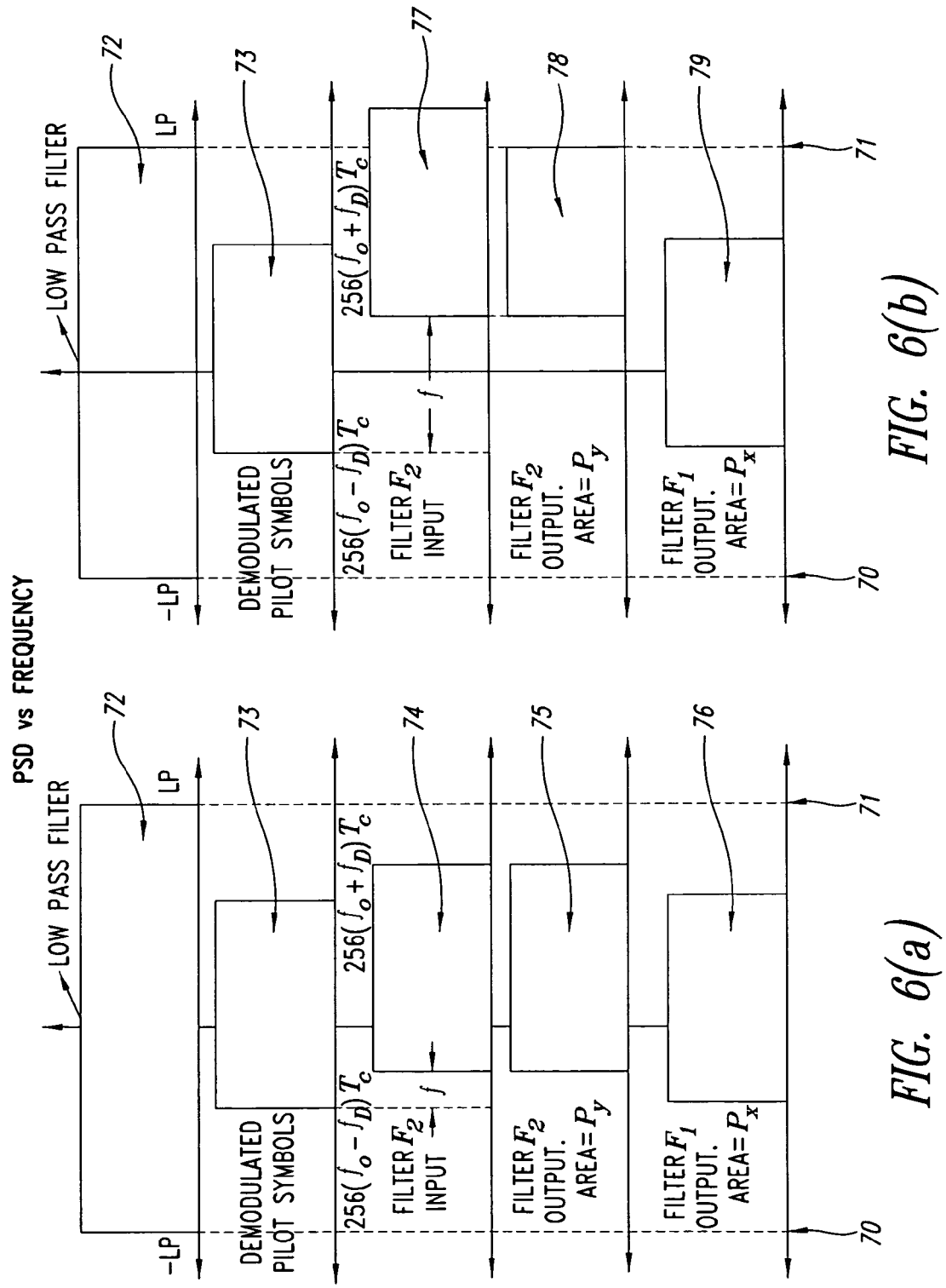
FIG. 6(a) is a diagram comparatively illustrating the power of filtered outputs, with and without complex rotation.
FIG. 6(b) is a diagram comparatively illustrating the power of filtered outputs with and without complex rotation.

An example illustrating an embodiment of the method for frequency estimation is described with reference to FIGS. 6(a) and 6(b). In FIGS. 6(a) and 6(b), the upper and lower corner frequency of the low pass filters 45 and 46 are shown as 71 and 70 respectively. The values "LP" and "−LP" correspond to the upper and lower corner frequencies respectively for low pass filters 45 and 46. The area 72 represents the passband for the LPFs 45 and 46. The Normalized PSD of demodulated pilot symbols (i.e., the PSD of s(n) 18 before filtering using LPF 46) is shown as area 73, and has upper and lower corner frequencies 256$(f_o+f_D)T_C$ and 256$(f_o-f_D)T_C$ respectively. After performing complex rotation, the Normalized PSD 73 is shifted by a factor f. In this example, the value of f is positive, thus resulting in the right shifted PSD shown as area 74 (i.e., the PSD of x(n) 19 before filtering using LPF 45). When x(n) 19 is passed through LPF 45, the band-limited result is shown as the PSD in area 75 (i.e., the PSD corresponding to $P_y$). Similarly, when s(n) 18 is passed through LPF 46, the band-limited result is shown as the PSD in area 76 (i.e., the PSD corresponding to $P_x$). It can be seen from FIG. 6(a) that the power of the filter output ($P_x$) is nearly equal to the power of the demodulated pilot symbols ($P_y$) if the PSD 74 of the input to filter 45 is entirely contained within the passband of the LPFs 45 and 46 (i.e., $P_y=P_x$).

In another example shown in FIG. 6(b), complex rotation of the demodulated pilot symbols causes the Normalized PSD 73 to shift by a larger factor f. In this example, the value of f is positive, which results in the right shifted PSD shown as area 77. However, shift from complex rotation leaves a portion of the PSD 77 outside the upper corner frequency (LP) of LPF 45. Thus, when s(n) 18 and x(n) 19 are respectively passed through LPFs 46 and 45, the band-limited result of the power of the output from LPF 45 (shown as the PSD in area 78) is less than the band-limited power of the output of LPF 46 (shown as the PSD in area 79). It can be seen from FIG. 6(b) that the power of the output of filter 45 ($P_y$) is less than the power of the output of filter 46 ($P_x$) if the PSD of the input to filter 45 is not entirely contained within the passband of the LPFs 45 and 46 (i.e., $P_y<P_x$).

For a fixed value of f in $e^{j2\pi fn}$, powers $P_y$ and $P_x$ are measured. These measurements are used to estimate the frequency offset as follows. Let $f_R$ be the maximum positive value of f for which $P_y=P_x$. The upper corner frequency ($f_m$) can therefore be expressed as shown in Equation 8:

$$f_m = LP - f_R \qquad \text{Equation 8}$$

Let $f_L$ be the minimum negative value of f for which $P_y=P_x$. The lower corner frequency ($f_n$) is therefore expressed as shown in Equation 9:

$$f_n = -LP - f_L \qquad \text{Equation 9}$$

In selecting LPF 45 and LPF 46 one has to ensure that the upper corner frequency 36 and lower corner frequency 37 is less than LP and greater than −LP (i.e., LP>$f_m$>−LP and LP>$f_n$>−LP). Since an ideal low pass filter cannot be realized and a finite and discrete number of values must be used to express the power calculations $P_y$ and $P_x$, a threshold value of T is applied, where T<1. T is the correction factor, which is given the value of about 0.9, for example. The value of T can be varied depending on the roll-off factor for the low pass filter used in 45 and 46.

Thus, $f_R$ can be redefined as the maximum positive value of f for which $P_y$ and $P_x$ satisfy the criteria in Equation 10. Similarly, $f_L$ is the minimum negative value of f for which $P_y$ and $P_x$ satisfy the criteria in Equation 10:

$$P_y > P_x T \qquad \text{Equation 10}$$

The aim is to find (by estimation using a binary search) the maximum positive value of f (i.e., $f_R$) and the minimum negative value of f (i.e., $f_L$) which results in power values for $P_y$ and $P_x$ that satisfy the inequality in Equation 10.

To determine the values of $f_R$ and $f_L$, the value of f can be increased or decreased at particular small intervals until the inequality in Equation 10 is satisfied. In an embodiment, the value of f is increased (to find the maximum positive value of f) or decreased (to find the minimum negative value of f) at intervals of 0.25 (for example, f=0.5, 0.75, . . . and so on; or f=−0.5, −0.75, . . . and so on). Alternatively, the value of f is increased or decreased by a factor $2^{-m}$, where m is a positive integer greater than 0 and where the value of m is initially set at 1. Still further, the value of m is increased by 1 each time the value of f is adjusted. Alternatively, a binary search may be employed to determine the values of $f_R$ and $f_L$, which is more efficient. The variable modified in the binary search is f. The range of f is dependent on the upper (LP 71) and lower (−LP 70) corner frequencies of the low pass filters 45 and 46.

For example, assume that the values of LP and −LP are respectively set at 0.2 and −0.2, and the speed of the MSR (v) is between 0 kilometers per hour ("kph") and 300 kph, and the frequency offset ($f_o$) is less than 2000 Hz (i.e., equivalent to a maximum clock difference of 1 ppm), and the correlation length of the Pilot Correlator is 256, the range of the absolute value of f that has to be searched to determine the values of $f_R$ and $f_L$ (i.e., |f|) can be determined. The values of $T_C$ and $f_C$ are assumed to be 0.26 µs and 2 GHz respectively. By applying the above assumptions to Equation 3, the maximum value of $f_m$ (i.e., $f_m$=0.17) occurs when v=300 kph and $f_o$=2000. When $f_m$ attains its maximum value, $f_R$ attains its minimum value (i.e., $f_R$=0.03, using Equation 8). Similarly, according to Equation 3, the minimum value of $f_m$ (i.e., $f_m$=−0.13312) occurs when v=0 kph and $f_o$=−2000 Hz. When $f_m$ attains its minimum value, $f_R$ attains its maximum value (i.e., $f_R$=0.3312, using Equation 8). Therefore, the range of absolute values of f that has to be searched to determine the values of $f_R$ (and $f_L$) is given as Equation 11:

$$0.03 < |f| < 0.3312 \quad \text{Equation 11}$$

In Equation 11, the positive estimated values of f determine $f_R$, while the negative estimated values of f determine $f_L$. Hence, two separate binary searches are required, to separately search for the maximum positive estimated value of f and the minimum negative estimated value of f. The binary search estimates the value of $f_R$ and $f_L$ to an accuracy of a fractional bits, where a is within the range of 5 to 8, for example.

Figure 7:
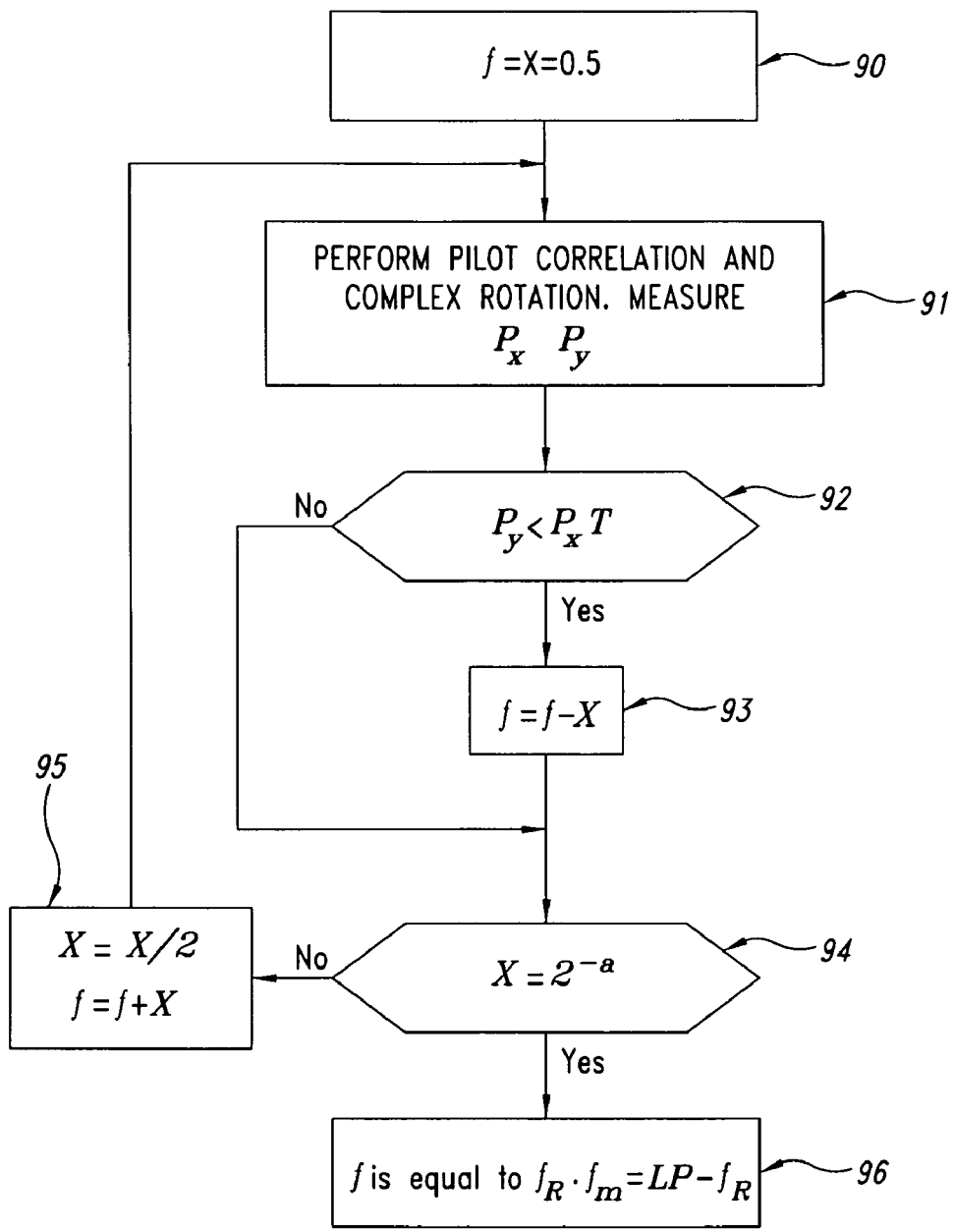
FIG. 7 is a process flow diagram of an embodiment of a binary search to determine the upper corner frequency value.

FIG. 7 is a flowchart showing the steps in an embodiment of the binary search method used to estimate the value of $f_R$ (i.e., the maximum positive value of f). The method starts at step 90, where f is initially set the value of 0.5 and the variable X is initially set the value of 0.5. In step 91, correlation of the received signal is performed by the Pilot Correlator 23 to derive demodulated pilot symbols, s(n) 18. The demodulated pilot symbols 18 are passed through a low pass filter 46 and the power of the filter output is measured 48 as $P_x$. The demodulated pilot symbols 18 are also subjected to complex rotation 44 (by multiplying each of the demodulated pilot symbols 18 by the factor $e^{j2\pi f n}$) and the complex rotated demodulated pilot symbols 19 are passed through another low pass filter 45 with the power of the filter output measured 47 as $P_y$. After determining the value of $P_y$ and $P_x$, the method progresses to step 92. In step 92, the condition ($P_y < P_x$ T) is checked, where T is the correction factor, which is set at 0.9 for example. If the condition in step 92 is satisfied, the method proceeds to step 93, which decreases the value of f by the value of X (i.e., f=f−X). However if the condition in step 92 is not satisfied, the value of f is unchanged and the method proceeds to step 94. In step 94, the condition ($X=2^{-a}$) is checked, which determines whether the value of X has reached the required level of accuracy (i.e., by the number of fractional bits) determined by the factor a. If the condition in step 94 is satisfied, this indicates the end of the binary search, as shown in step 96. In step 96, the value of f from the binary search is the estimated value of $f_R$. Accordingly, the value of $f_m$ can be calculated according to Equation 8. The condition in step 94 will eventually be met by further iterations of the steps in the method described, since the degree of accuracy improves after each iteration (i.e., the value of X is adjusted after each iteration to become closer to the required level of fractional bit accuracy). However if the condition in step 94 is not met, the value of X is updated to become half of its original value (i.e., X=X/2) and the value of X is added to the value of f (i.e., f=f+X). The new values of X and f are then used for another iteration of the method steps starting from step 91. As such, the estimation method involves an iteration of certain steps required for performing the binary search and stops when the value of f has attained the required degree of accuracy.

Figure 8:
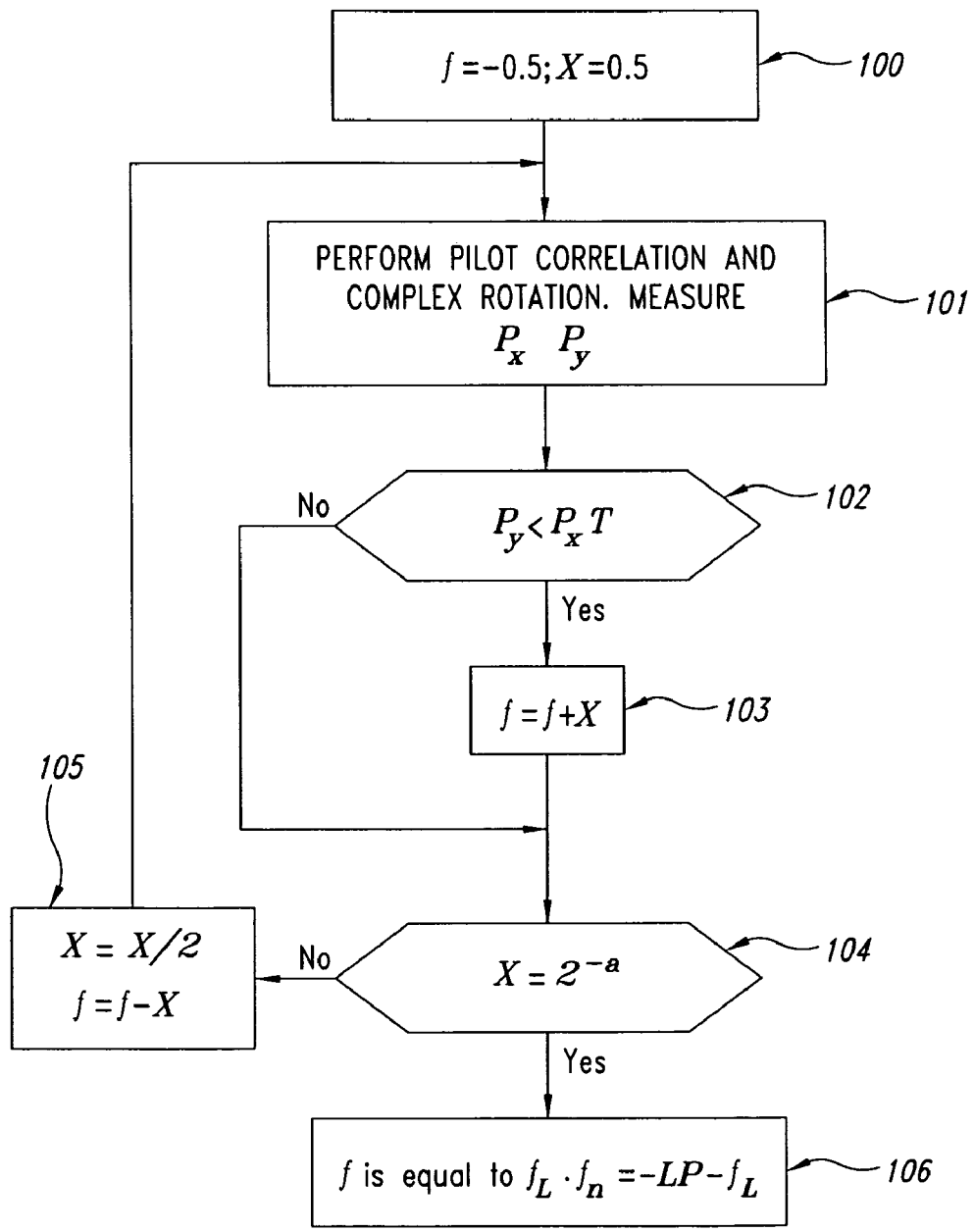
FIG. 8 is a process flow diagram of an embodiment of a binary search to determine the lower corner frequency value.

FIG. 8 is a flowchart showing the steps in an embodiment of the binary search method used to estimate the value of $f_L$ (i.e., the minimum negative value of f. The method starts at step 100, where f is initially set the value of −0.5 and the variable X is initially set the value of 0.5. In step 101, correlation of the received signal is performed by the Pilot Correlator 23 to derive demodulated pilot symbols, s(n) 18. The demodulated pilot symbols 18 are passed through a low pass filter 46 and the power of the filter output is measured 48 as $P_x$. The demodulated pilot symbols 18 are also subjected to complex rotation 44 (by multiplying each of the demodulated pilot symbols 18 by the factor $e^{j2\pi f n}$) and the complex rotated demodulated pilot symbols 19 are passed through another low pass filter 45 with the power of the filter output measured 47 as $P_y$. After determining the value of $P_y$ and $P_x$, the method progresses to step 102. In step 102, the condition ($P_y < P_x$ T) is checked, where T is the correction factor, which is set at 0.9, for example. If the condition in step 102 is satisfied, the method proceeds to step 103, which increases the value of f by the value of X (i.e., f=f+X). However if the condition in step 102 is not satisfied, the value of f is unchanged and the method proceeds to step 104. In step 104, the condition ($X=2^{-a}$) is checked, which determines whether the value of X has reached the required level of accuracy (i.e., by the number of fractional bits) determined by the factor a. If the condition in step 104 is satisfied, this indicates the end of the binary search, as shown in step 106. In step 106, the value of f from the binary search is the estimated value of $f_L$. Accordingly, the value of $f_n$ can be calculated according to Equation 9. The condition in step 104 will eventually be met by further iterations of the steps in the method described, since the degree of accuracy improves after each iteration (i.e., the value of X is adjusted after each iteration to become closer to the required level of fractional bit accuracy). However if the condition in step 104 is not met, the value of X is updated to become half of its original value (i.e., X=X/2) and the value of X is subtracted from the value of f (i.e., f=f−X). The new values of X and f are then used for another iteration of the method steps starting from step 101. As such, the estimation method involves an iteration of certain steps required for performing the binary search and stops when the value of f has attained the required degree of accuracy.

Once the values of $f_m$ and $f_n$ are obtained, it is possible to calculate the estimated frequency offset ($f_o$) using Equation 6. As a by-product, the speed of the MSR can also be obtained using Equation 7. The speed, v, calculated from Equation 7 could be used to improve the MSR's receptive performance by further assisting the Phase Correction Unit 25 to make a more accurate adjustment to compensate for any phase delays in the signal received by the MSR.

As shown in FIG. 4, the Digital Signal Processor 49 ("DSP") adaptively changes the value of f and eventually determines the values of $f_m$ and $f_n$ using a binary search described above. For example, in every iteration of the estimation method, a fixed number of demodulated pilot symbols will be extracted from the signal received by the MSR, using the correlation process performed in steps 91 and 101, and subsequently used for calculating the value of $P_y$ and $P_x$. For example, about 400 pilot symbols are used in each iteration for determining the value of $P_y$ and $P_x$. After the value of $P_y$ and $P_x$ has been determined, the DSP performs the two binary searches (shown as steps 90, 91, 92, 93 and 94 in FIG. 7, and steps 100, 101, 102, 103 and 104 in FIG. 8) to determine an estimated value of $f_m$ and $f_n$. Assuming that the value of X in both separate binary searches has not reached the required level of accuracy (i.e., the condition in steps 94 and 104 have not been satisfied), the value of f is adjusted (in steps 95 and 105) and the value of f in the complex rotation factor $e^{j2\pi f n}$ is updated 80 (as shown in FIG. 4). As a result, subsequent sets of a fixed number of demodulated pilot symbols will each be processed by the Frequency Offset Estimation Block 40 using an updated value of f.

Initially the predicted frequency error is high. Similar to other frequency offset estimation algorithms the procedure needs to be repeated several times before the desired accuracy, described in Table 1 below, is achieved.

The estimation method, as described above, was tested under the conditions prescribed in Case 1 as described in the specification "UE Radio Transmission and Reception (FDD) 3GPP TS 25.101 V3.2.0", the contents of which is hereby incorporated into this specification. The results of three different tests using the frequency shift based estimation method described herein are provided in Table 1. The speed (v) of the MSR was varied in the test, in order to take account of the range of values for v in the presence of different frequency offsets.

The test also involved finding a suitable value of T, which was determined by simulations and further described as follows. For known values corresponding to the frequency offset ($f_o$), speed (v) and $f_R$, the value of f in factor $e^{j2\pi fn}$ was tested based on different values around the value of $f_R$. For example, the following values of f were tested $f=f_R-0.05$; $f=f_R$; $f=f_R+0.05$. For each value of f the ratio $P_y/P_x$ from the power of filtered outputs 47 and 48 was measured. The experiment was repeated again for different values of $f_o$ and v. Each time a new ratio for $P_y/P_x$ was calculated. The mean of all the calculated ratios for $P_y/P_x$ was selected as the value of T. For example, the value of T is less than 1, and as a further example, T=0.9. The value of T found using this technique was quite stable in response to variations in the signal strength for different multipaths and also in response to variations in the signal-to-noise ratio ("SNR") of the signal received by the MSR.

A Low Pass Infinite Impulse Response ("IIR") filter, with LP=0.2 (i.e., upper corner frequency (LP)=0.2; and lower corner frequency (−LP)=−0.2) and T=0.9, was used for presenting the results shown in Table 1. Also, the power (i.e., $P_x$ or $P_y$) was calculated using an average of 400 demodulated pilot symbols. The carrier frequency ($f_C$) used in the test was 2 GHz.

TABLE 1

Results for Frequency Offset Estimation

| | Test Number | | |
|---|---|---|---|
| | 1 | 2 | 3 |
| Correlation Length | 256 | 256 | 256 |
| Speed of the MSR (kph) | 100 | 150 | 100 |
| Estimated Speed (kph) | 117 | 181 | 125 |
| Actual frequency offset ($f_0$) Hz | 250 | 1000 | 2500 |
| Estimated frequency offset (Hz) | 245 | 955 | 2429 |
| Error in the estimated frequency offset (Hz) | 5 | 45 | 71 |
| Actual difference between the BS and MSR clocks (ppm) | 0.125 | 0.5 | 1.25 |
| Estimated difference between the BS and MSR clocks (ppm) | 0.1225 | 0.4775 | 1.2145 |
| Error in the estimated difference between the BS and MSR clocks (ppm) | 0.0025 | 0.0225 | 0.0355 |

Note that in Table 1, the error in the estimated frequency offset is the absolute difference between the actual frequency offset between the BS and MSR, and the estimated frequency offset between the BS and MSR. Similarly, the error in the estimated difference between the BS and MSR clocks is the absolute difference between the actual difference between the BS and MSR clocks, and the estimated difference between the BS and MSR clocks.

When the initial estimation is obtained by the DSP, the frequency offset could be large, such as in Test Number 2 where the actual frequency offset is 1000 Hz. The DSP performs a finite number of repeated frequency estimations. For example, five estimations may be repeatedly performed and the actual frequency offset of 1000 Hz could be estimated as 980 Hz, 930 Hz, 940 Hz, 970 Hz and 955 Hz respectively in each of these estimations. The average of the estimated frequency offset values is determined, which in this example is 955 Hz. Thus, in this example, the actual frequency offset of 1000 Hz is estimated by the DSP as a frequency offset of 955 Hz. Accordingly, the frequency generated in the MSR is increased by 955 Hz to compensate for the frequency offset. In this example, the error between the estimated frequency offset and the actual frequency offset is 1000 Hz−955 Hz=45 Hz. As the frequency offset estimation method is repeated, the error in the estimated frequency offset is gradually reduced. For example, for frequency offset estimations, the frequency offset estimation method is repeated 5 to 10 times. In a similar fashion, repeated estimations can also be performed to determine speed estimations, however, in general, this may not be necessary.

The method for frequency offset estimation can be used in wireless systems, such as the UMTS FDD/3G, GSM, 3G TD-SCDMA, IS-95 and CDMA2000 systems, to improve the system performance.

The method of estimating the frequency offset between the BS and MSR may be performed using a fixed number of pilot symbols stored, for example, in a cache. This involves iteratively performing the frequency estimation method over those pilot symbols stored in the cache. Once the frequency offset has been determined based on the cached pilot symbols the determined frequency offset value is used to correct the frequency offset between the BS and MSR (the way this is done is beyond the scope of the invention). This technique may be applied at periodic time intervals, for example, every 15 minutes of transmission time.

Alternatively, the method of estimating the frequency offset may be performed continuously on the fly. For example, the MSR may process a first batch of a fixed number of demodulated pilot symbols (e.g., in batches of 400 demodulated pilot symbols). The filtered powers (i.e., $P_y$ and $P_x$) are determined and compared, in accordance with the method described, for the first batch of pilot symbols. A frequency factor value is determined based on the values of $P_y$ and $P_x$, which is then updated as the new value of f in the factor $e^{j2\pi fn}$. The estimation method, using the new value of f derived from the first batch of pilot symbols is applied to a second batch of pilot symbols, as so on for further batches of pilot symbols. In this way, the frequency factor may be adjusted for each batch of demodulated pilot symbols based on the frequency offset characteristics in the signal received by the MSR.

Although the frequency offset estimation performed by the Frequency Offset Estimation Block 40 is shown in FIG. 4 as a separate hardware block that is coupled to components in a Rake Finger 12, the components in the Frequency Offset Estimation Block 40 may be integrated into other components of the Rake Finger 12. For example, the functionality or components in the Frequency Offset Estimation Block 40 may be integrated into the Pilot Correlator 23 or the Phase Correction Unit 25. The frequency offset estimation method described herein can be implemented in either software (such as machine-readable instructions stored on a machine-readable medium) or hardware.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for estimating a frequency offset between a receiver and a transmitter, said method comprising:
   (a) receiving a first signal from said transmitter and demodulating said first signal;
   (b) performing a frequency shift on said first signal by a predetermined frequency factor to generate a second signal;
   (c) filtering each of said first and second signals;
   (d) determining power of each of said filtered first and second signals;
   (e) determining an upper corner frequency value of said first signal using the determined power of said filtered first and second signals;
   (f) determining a lower corner frequency value of said first signal using the determined power of said filtered first and second signals; and
   (g) determining a frequency offset based on said upper corner frequency value and said lower corner frequency value.

2. The method of claim 1 wherein (e) includes: performing a comparison of the power of said filtered first signal with the power of said filtered second signal, and if said comparison indicates that a first predetermined condition is not satisfied, performing a first adjustment of said frequency factor and repeating (b) to (d).

3. The method of claim 2 wherein if said comparison indicates that the first predetermined condition is satisfied, performing a second adjustment of said frequency factor.

4. The method of claim 3 wherein said second adjustment includes subtracting a predefined control factor, X, from said frequency factor.

5. The method of claim 4 further comprising performing a comparison of the control factor, X, with a predetermined accuracy level, wherein if the comparison indicates that a second predetermined condition is not satisfied, said first adjustment is performed.

6. The method of claim 5 wherein said first adjustment includes assigning a new value of X/2 to said control factor, and adding the new control factor to said frequency factor before repeating (b) to (d).

7. The method of claim 5 wherein said comparison of the control factor with the predetermined accuracy level is represented by $X=2^{-a}$ where a is a predetermined integer greater than zero.

8. The method of claim 2 wherein said comparison includes determining whether the power of said filtered second signal is less than the power of said filtered first signal multiplied by a predetermined correction factor.

9. The method of claim 2 wherein said first adjustment of said frequency factor includes increasing said frequency factor.

10. The method of claim 1 wherein (c) includes low pass filtering each of said first and second signals.

11. The method of claim 1 wherein (f) includes: performing a comparison of the power of said filtered first signal with the power of said filtered second signal, and if said comparison indicates that a first predetermined condition is not satisfied, performing a first adjustment of said frequency factor and repeating (b) to (d).

12. The method of claim 11 wherein if said comparison indicates that the first predetermined condition is satisfied, performing a second adjustment of said frequency factor.

13. The method of claim 12 wherein said second adjustment includes adding a predefined control factor, X, to said frequency factor.

14. The method of claim 13, further comprising performing a comparison of the control factor, X, with a predetermined accuracy level, wherein if the comparison indicates that a second predetermined condition is not satisfied, said first adjustment is performed.

15. The method of claim 14 wherein said first adjustment includes assigning a new value of X/2 to said control factor, and subtracting the new control factor from said frequency factor before repeating (b) to (d).

16. The method of claim 15 wherein said comparison of the control factor with the predetermined accuracy level is represented by $X=2^{-a}$, where a is a predetermined integer greater than zero.

17. The method of claim 11 wherein said comparison includes determining whether the power of said filtered second signal is less than the power of said filtered first signal multiplied by a predetermined correction factor.

18. The method of claim 11 wherein said first adjustment of said frequency factor includes decreasing said frequency factor.

19. The method of claim 1, further comprising determining a relative speed of the receiver with respect to the transmitter based on the determined upper and lower corner frequencies.

20. A system for estimating a frequency offset between a receiver and a transmitter, the system comprising:
   a) means for receiving a first signal from said transmitter and demodulating said first signal;
   b) means for performing a frequency shift on said first signal by a predetermined frequency factor to generate a second signal;
   c) filter means for filtering each of said first and second signals;
   d) means for determining power of each of said filtered first and second signals; and
   e) processor means for determining upper and lower corner frequency values of said first signal using the determined power of said filtered first and second signals and for determining a frequency offset based on said determined upper and lower corner frequency values.

21. The system of claim 20 wherein the receiver is a rake receiver.

22. The system of claim 21 wherein the rake receiver is housed in a mobile station.

23. The system of claim 20 wherein the transmitter is a base station transmitter.

24. The system of claim 20, further comprising means for determining a relative speed of the receiver with respect to the transmitter based on the determined upper and lower corner frequencies.

25. The system of claim 20 wherein the processor means for determining the upper corner frequency value of the first signal includes means for performing a comparison of the power of the filtered first signal with the power of the filtered second signal, and if the comparison indicates that a first predetermined condition is not satisfied, the processor means performs a first adjustment of the frequency factor,
wherein if the comparison indicates that the first predetermined condition is satisfied, the processor means performs a second adjustment of the frequency factor, the second adjustment including subtracting a predefined control factor, X, from the frequency factor, the system further comprising:
means for performing a comparison of the predefined control factor, X, with a predetermined accuracy level, wherein if this comparison indicates that a second predetermined condition is not satisfied, the first adjustment is performed.

26. The system of claim 20 wherein the processor means for determining the lower corner frequency of the first signal includes means for performing a comparison of the power of the filtered first signal with the power of the filtered second signal, and if the comparison indicates that a first predetermined condition is not satisfied, the processor means performs a first adjustment of the frequency factor,
wherein if the comparison indicates that the first predetermined condition is satisfied, the processor means performs a second adjustment of the frequency factor, the second adjustment including adding a predefined control factor, X, to the frequency factor, the system further comprising:
means for performing a comparison of the predefined control factor, X, with a predetermined accuracy level, wherein if this comparison indicates that a second predetermined condition is not satisfied, the first adjustment is performed.

27. An apparatus to estimate a frequency offset between a receiver and a transmitter, the apparatus comprising:
a first module to receive a first signal from the transmitter and to demodulate the first signal;
a second module to perform a frequency shift on the first signal by a predetermined frequency factor to generate a second signal;
at least one filter coupled to the first and second modules to filter each of the first and second signals;
at least one third module coupled to the at least one filter to respectively determine power of each of the filtered first and second signals; and
a processor coupled to the at least one third module to determine upper and lower corner frequency values of the first signal based on the determined power of the filtered first and second signals, and further being coupled to determine a frequency offset based on the determined upper and lower corner frequency values.

28. The apparatus of claim 27 wherein the at least one filter includes a low pass filter.

29. The apparatus of claim 27, further comprising a fourth module to determine a relative speed of the receiver with respect to the transmitter based on the determined upper and lower frequencies.

30. The apparatus of claim 27 wherein the receiver includes a rake receiver of a mobile station, the rake receiver having the first, second, and third modules and also the filter and processor.

31. The apparatus of claim 30 wherein the rake receiver is part of a mobile station.

32. An article of manufacture, comprising:
a machine-readable medium having instructions stored thereon to allow a processor to estimate a frequency offset between a receiver and a transmitter, by:
performing a frequency shift on a first signal, received from the transmitter, by a predetermined frequency factor to generate a second signal;
filtering each of the first and second signals;
determining the power of each of the filtered first and second signals;
determining upper and lower corner frequency values of the first signal using the determined power of the filtered first and second signals; and
determining a frequency offset based on the upper corner frequency value and the lower corner frequency value.

33. The article of manufacture of claim 32 wherein the instructions to determine either or both the upper corner frequency and the lower corner frequency includes instructions to:
perform a comparison of the power of the filtered first signal with the power of the filtered second signal;
perform a first adjustment of the frequency factor if the comparison indicates that a first predetermined condition is not satisfied; and
perform a second adjustment of the frequency factor if the comparison indicates that the first predetermined condition is satisfied.

34. The article of manufacture of claim 33 wherein the second adjustment includes, with respect to determining the upper corner frequency, subtracting a predefined control factor from the frequency factor, the machine readable medium further including instructions stored thereon to perform a comparison of the predefined control factor with a predetermined accuracy level, wherein if this comparison indicates that a second predetermined condition is not satisfied, the first adjustment is performed.

35. The article of manufacture of claim 33 wherein the second adjustment includes, with respect to determining the lower corner frequency, adding a predefined control factor to the frequency factor, the machine readable medium further including instructions stored thereon to perform a comparison of the predefined control factor with a predetermined accuracy level, wherein if this comparison indicates that a second predetermined condition is not satisfied, the first adjustment is performed.

36. The article of manufacture of claim 33 wherein with respect to determining the upper corner frequency, the instructions to perform the first adjustment include instructions to increase the frequency factor; and
wherein with respect to determining the lower corner frequency, the instructions to perform the first adjustment include instructions to decrease the frequency factor.

37. The article of manufacture of claim 33 wherein the instructions to perform the comparison of the power of the filtered first signal with the power of the filtered second signal include instructions to determine whether the power of the filtered second signal is less than the power of the filtered first signal multiplied by a predetermined correction factor.

38. The article of manufacture of claim 32 wherein the machine-readable medium further includes instructions stored thereon to determine a relative speed of the receiver with respect to the transmitter based on the determined upper and lower corner frequencies.

* * * * *